United States Patent [19]

Roméas

[11] Patent Number: 4,460,927
[45] Date of Patent: Jul. 17, 1984

[54] OPTICAL READING DEVICE FOR READING AN INFORMATION CARRIER WITH MOTION EFFECT FACILITIES

[75] Inventor: René Roméas, Paris, France
[73] Assignee: Thomson-Brandt, Paris, France
[21] Appl. No.: 865,331
[22] Filed: Dec. 28, 1977

[30] Foreign Application Priority Data

Jan. 4, 1977 [FR] France .................................. 7700079

[51] Int. Cl.³ .............................................. H04N 5/85
[52] U.S. Cl. .................................... 358/342; 360/10.1; 360/35.1; 358/346; 369/111
[58] Field of Search ................. 358/128, 131, 147, 54, 358/140, 312, 335, 342, 345, 346, 348; 360/10, 11, 10.1, 9.1, 11.1, 72.2, 33.1, 37.1, 35.1; 179/100.3 V; 369/47, 48, 111, 30

[56] References Cited

U.S. PATENT DOCUMENTS

| | | | |
|---|---|---|---|
| 3,366,733 | 1/1968 | Frohbach | 358/128 |
| 3,931,457 | 1/1976 | Mes | 358/128 |
| 3,947,870 | 3/1976 | Yumde et al. | 358/147 X |
| 4,015,285 | 3/1977 | Roméas | 358/128 |
| 4,057,832 | 11/1977 | Kappert | 358/128 |
| 4,106,058 | 8/1978 | Roméas et al. | 358/128 |

Primary Examiner—Alan Faber
Attorney, Agent, or Firm—Cushman, Darby & Cushman

[57] ABSTRACT

The invention relates to optical reading of a track in a spiral or concentric circles, carried by an information substrate, usually a disc, television signals being recorded along the track. The reading device includes a device for generating track jump pulses in which bits written at the top of pairs of adjacent fields in order to determine whether the fields being read belongs or does not belong to the same frame so that jump control pulses are generated when the bits are found to be identical. The invention is of use inter alia for reading television signals recorded on video-disc and obtained by analyzing film frames particularly to bring about a stop at a frame by jumping a track, either when frames are analyzed in two tracks or in the case of analysis in the sequence 2, 3, 2, 3 etc. ....

10 Claims, 9 Drawing Figures

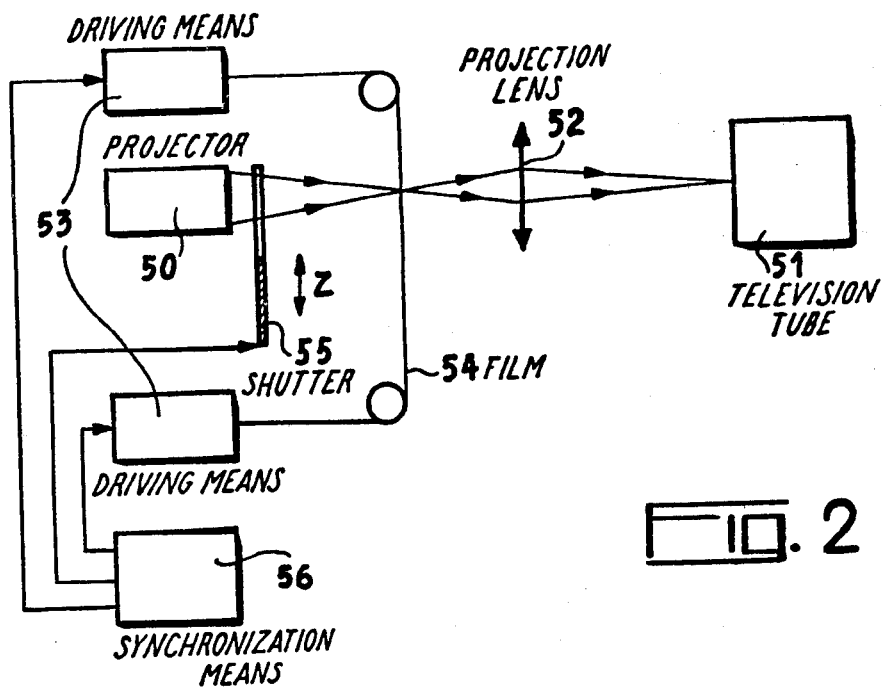
FIG. 2
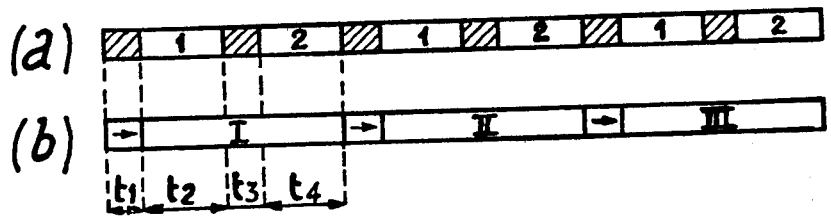
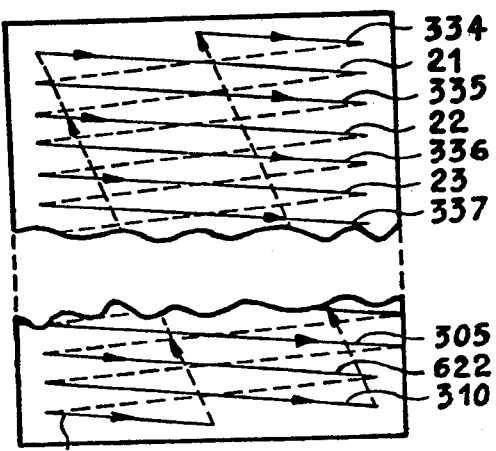
FIG. 3

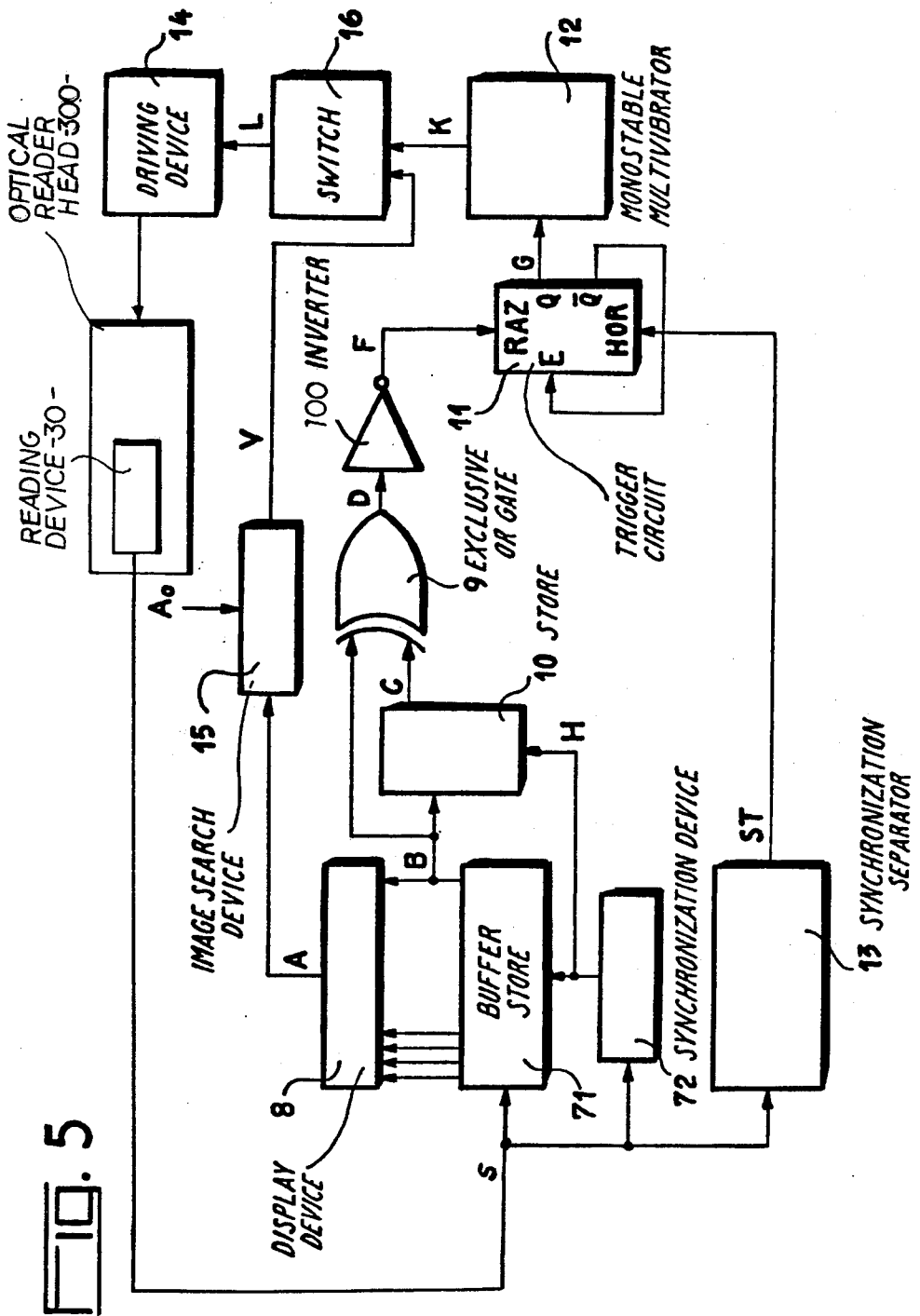

OPTICAL READING DEVICE FOR READING AN INFORMATION CARRIER WITH MOTION EFFECT FACILITIES

BACKGROUND OF THE INVENTION

1. Field of the Invention

The invention relates to optical reading of a track in a spiral or concentric circles, carried by an information substrate, usually in the form of a disc, television signals being recorded along the track. The invention relates more particularly to the system for generating a track jump pulse, whereby the radical motion of the reading can be modified to obtain a stop at an frame, or other effects such as slowing-down and acceleration.

2. Description of the Prior Art

Recorded television signals are obtained by analysis of frames in at least two fields, each frame being made up of an odd number of lines (625 in Europe) distributed among two fields. European television standards are based on a frequency of 50 frames per second. Analysis of frames is based on two fields, giving 25 images per second. The disc rotates at 1500 rpm. Other standards such as NTSC are based on a frequency of 60 fields per second.

One of the most frequently-used sources of frames is the cinema. A film moves at 24 images per second. It can easily be adapted to television in the case of European standards. The motion is very slightly accelerated, i.e from 24 to 25 frames per second. The case is different for frequency standards of 60 fields per second. In that case, one method of maintaining a normal frame speed is to analyze an frame during two frames, then the next frame for three fields and so, the third field being a repetition of the first. On average, therefore, we have two and a half fields per frame. The resulting average speed is 24 images per second. In the case of frequency standards of 50 frames per second, a complete frame is recorded on each turn of track. In order to obtain an automatic stop at a frame, it is sufficient to generate a signal at the frequency 25 Hz at the beginning of the first field of a frame in order to synchronize a device causing the reading head to jump back a radial distance equal to the pitch of the track, so that the first and second field of the same frame are read in succession for an indefinite number of times. Other effects such as acceleration or reversing are similarly obtained by causing the reproduction head to jump one or more turns forwards or backwards.

This method cannot be applied to standards based on 60 fields per second, since if the jump is synchronized by a signal at the frequency 25 Hz, there is a danger of reading two fields coming from two different frames. This disadvantage can be obviated by a manual device for resetting the jump device if it is found that two different frames are superposed.

SUMMARY OF THE INVENTION

The invention can be used for obtaining an automatic stop at the desired frame irrespective of the method of analyzing the frames. The system for generating a track jump pulse according to the invention makes use of the fact that the frame numbers are recorded at the beginning of each field (in certain systems of recording) to find out whether the reproduced field has or has not come from the same frame as the previously reproduced field. Accordingly, the system comprises means for comparing the recorded numbers read on two successive fields and for generating a pulse in the case where the two numbers are found to coincide. When the frame numbers are not recorded, it is sufficient to record a bit which changes value at each new frame.

According to the invention, there is provided an optical reading device for reading signal recorded on an information substrate along a track forming turns, each of said turns comprising two fields of video signal belonging alternately to a same frame and to two adjacent frames, each of said fields comprising an frame identification signal recorded at the top of each field, said identification signal comprising at least one test bit changing value at each successive frame, said optical reading device comprising an optical reader head, driving means for moving said reader head, and a device for generating track jump pulses for controlling said driving means, said device comprising means for detecting said frame identification signals and comparing means for comparing two successive of said identification signals read in two adjacent fields and for delivering at least one of said track jump pulses when said two adjacent fields belong to a same frame.

BRIEF DESCRIPTION OF THE DRAWINGS

For a better understanding of the present invention and to show how the same may be carried into effect, reference will be made to the following description and the attached drawings among which:

FIG. 2 is a diagram of a telecinema device;

FIGS. 3a-c and 4, a and b, are diagrams illustrating two methods of analyzing frames;

FIG. 5 shows an embodiment of the invention, and

DESCRIPTION OF THE PREFERRED EMBODIMENTS

Figure 1:
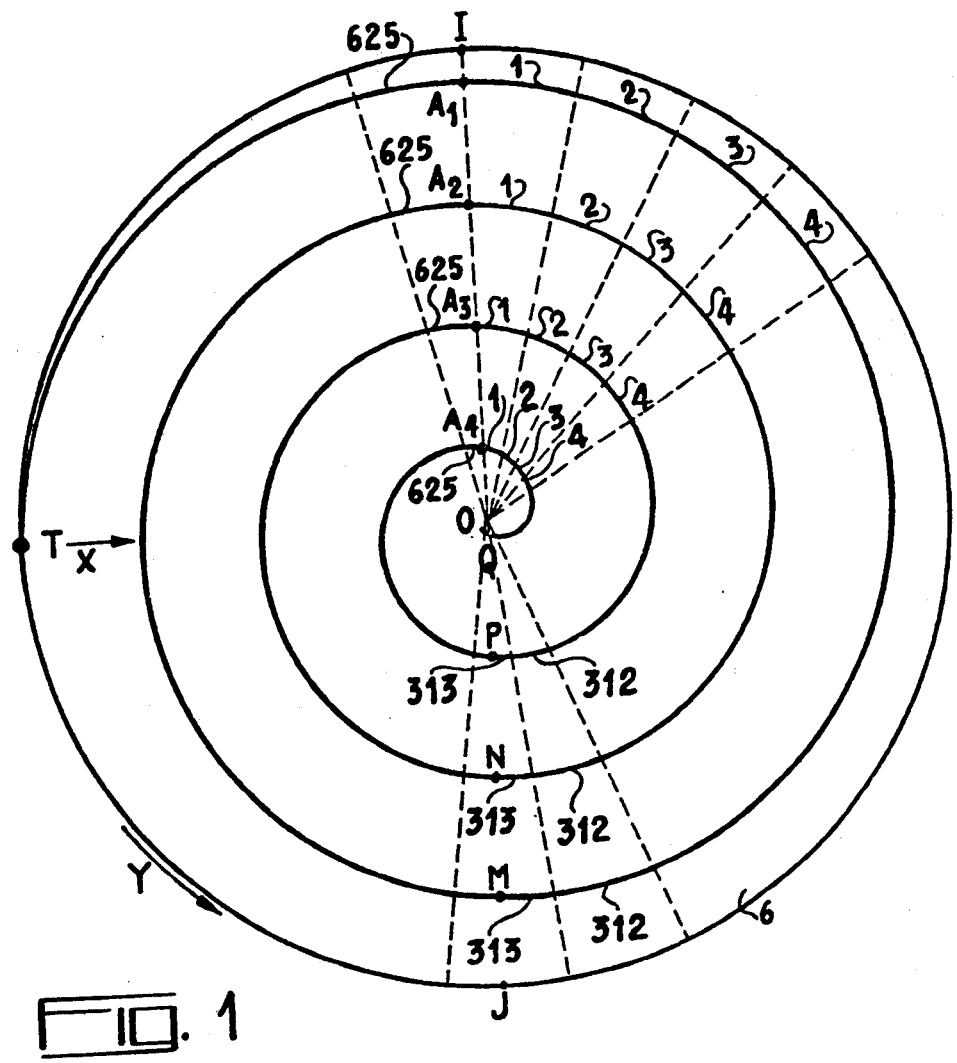
FIG. 1 shows an arrangement of television signals recorded on the surface of a disc.

FIG. 1 shows an arrangement of television signals recorded on the surface of a recording, 6, in the form of a spiral track on a disc. The surface is divided into 625 equal angular sectors by chain-line radii coming from a centre O. A television image scanning line is recorded on each of the recording areas obtained by dividing the turns by the angular sectors. In the present case the standard number of lines is 625. The number associated with each area is the rank of the corresponding scanning line.

The recording is read by rotating it around centre O in the direction of arrow Y, using a constant-speed drive mechanism, and by projection reading spot T on to the track, the spot being supplied by a reading head moving radially in the direction X. The components of the drive mechanisms and the reproduction system are not shown in the drawing.

A television frame is fully represented by two fields, each of 312.5 lines. Consequently, a complete frame is reproduced at each revolution of disc 6. Lines having the same rank and corresponding to successive frames are recorded in the recording areas disposed in a single angular sector. In the drawing, the ranks are denoted by the numbers 1, 2, 3, 4 ... 625.

An important source of frames is the cinema. A telecinema device is used to analyze films in order to obtain television signals which can be displayed on a receiver or recorded on a video disc. FIG. 2 shows the components of a telecinema device, usually called a "jerky-advance telecinema unit". A projector 50 illuminates the frames of a film 54 recorded at 24 frames per second, the illuminated frames being directed toward a television tube 51 by a projection lens 52. The tube comprises a photosensitive plate or "mosaic" having a store effect. The forward motion of the film is controlled by driving means 53. A synchronization means 56 coordinates the film drive with the blocking or non-blocking of the projector by a shutter 55, the motion of which is indicated by an arrow Z. These two motions depend on the frame-analyzing process.

In countries where the electric power frequency is 50 Hz, television standards at 50 fields per second have been adopted. The process of analysis is described in the time diagram in FIG. 3. The times during which the film is illuminated and not illuminated are shown at (a). The non-illuminated times, i.e when the projector is covered, are shaded. The total duration of a non-illuminated time followed by an illuminated time is 1/50 s. At (b), arrows indicate the advance of the film, image by image. The numbers I, II, III . . . indicate successive images illuminated by the projector.

During the time $t_1$, the film is moved so that it presents frame I in front of the projector. The film is not illuminated. During time $t_2$, the film is illuminated and an frame field (field 1) is analyzed. During the time $t_3$ the film is not illuminated and can therefore again be moved. During the time $t_4$, the film is illuminated and field 2 of the frame is analyzed. Fields 1 and 2 are interlaced as shown in FIG. 3 (c) which shows the scanning lines of the visible part of a frame, using a 625-line standard. The visible part of field 1 comprises the lines numbered 21 to 310. The visible part of field 2 comprises half the line numbered 334, lines 335 to 622 and half line 623. The invisible lines of each field correspond to the time intervals $t_1$ and $t_2$. When a recording is being made on disc 6 in FIG. 1 the lines are recorded on the tracks carrying the corresponding numbers. Points $A_1$, $A_2$, $A_3$, $A_4$ . . . mark the beginning of frames I, II, III, IV, . . . and are situated on the same radius OI.

The total duration of exposure of each frame is $T = 1/25$ s. Since the disc rotates at 25 rpm, one frame occurs per revolution and the speed of the film adds an acceleration of 4%, which is not perceived by the observer.

Figure 4:
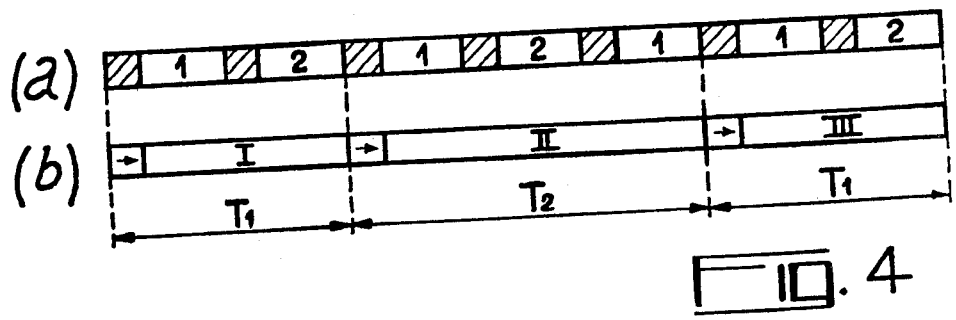

In countries where the electric power frequency is 60 Hz, the television standards are based on a frequency of 60 fields per second. If the previously-mentioned process were used, the motion would have to be accelerated to an excessive extent, i. 24 frames per second to 30 frames per second. FIG. 4 is a diagram showing the steps of the process which can be used in such a case. FIG. 4(a) shows the illumination or shut-off times and FIG. 4(b) shows the advance of the film and the numbers of the frames illustrated by the projector. The total duration of an illumination time followed by a non-illumination time is equal to 1/60 s. The motion of the film is not regular. An frame (e.g frame I) lasts $T_1 = 2/60 = 1/30$ s; fields 1 and 2 are analyzed in succession during the illumination times, as before. The next frame, i.e frame II, lasts $T_2 = 3/60 = 1/20$ s. During two illumination times, fields 1 and 2 are analyzed in succession, whereas the analysis of field 1 is repeated during the third illumination time-interval. The next frame (III) is analyzed in the same manner as image I, and so on. The resulting average speed is 24 images per second. In recording 6 on FIG. 1, which rotates at 30 rpm, frame I is written on the area $A_1 M A_2$; image II is written in the area $A_2 NA_3 P$; and frame III is written in area $PA_4Q$. The frames begin either on radius OI or on radius OJ.

If a television signal is written on the disc by one of the aforementioned methods, it may be desirable to broadcast the same frame for a certain time. This is called "stopping at an frame".

Let us suppose that it is desired to stop at frame II. At the beginning of frame III a pulse (hereinafter called a jump pulse) is generated and, when applied to the mechanism for radially moving the reading system, causes the reading spot to return to the preceding turn. In this manner, the two fields of frame II are read an indefinite number of times.

In standards based on 50 fields per second, the jump pulse is obtained from a frame synchronization signal after recognizing that the frame has an even number. The field synchronization signal denotes the beginning of line 1 in the case of the first field, and the middle of line 313 in the case of the second field. It is extracted from a pulse train, the configuration of which is used to distinguish an even field from an odd field. It is always possible to know which are the first and second fields in analyzing a single frame. Thus, the jump pulse coincides e.g with the movement of the reading spot T over radius OI.

On the other hand, in the case of standards based on 60 fields per second, the field synchronisation signals cannot show the beginning of the first analysis frame since the beginning of each frame does not arrive at a constant frequency of 50 Hz. In that case the jump pulse must coincide either with radius OI or with radius OJ.

In some recording system, the video information and synchronization signals are recorded together with a number allocated to each frame in coded form in certain unused lines, in lines 16 and 329 in the case of the 625-line standard. The number is supplied by a counter which, at each new frame, is moved forward one unit by a pulse supplied by the telecinema device. Consequently, each frame, at the beginning of each of its fields (2 or 3 depending on circumstances), bears a number which distinguishes it from the preceding and the following frame. By comparing the lowest-weight bit of the number read at the beginning of a field with the lowest-weight read at the beginning of the preceding field it is possible to know whether the field is or is not the first field of a new frame, in which case the jump pulse is generated.

FIG. 5 shows an embodiment of the invention. The disc 6 shown in FIG. 1 is read by means of an optical reader head 300 including. A reading device 30 which delivers a signal S from which the video information can be extracted together with the various control signals, more particularly the field synchronization signal ST extracted from the signal S by a synchronization generator 13. Another device extracts from signal S the contents of the lines where the frame numbers are recorded, e.g lines 16 and 329. The latter device comprises e.g. a buffer store 71 controlled by a signal H made up of pulses in synchronism with lines 16 and 329, the pulses being generated from signal S by a synchronization device 72. At each pulse of signal H, the buffer store 71 recieves n bits, i.e a coded representation of the frame number recorded on a new field. The n bits can be sent to a display device 8. Only the lowest-weight bit is used, since it is a means of distinguishing an frame from the next. The bit is available at output B and is sent to a comparator 9, e.g an "exclusive OR" gate and to a store 10 (a trigger circuit) synchronized by pulses and which delivers at C, bit B delayed by a field. Bits B and C are applied to comparator 9, which delivers a "low" logic level at D when bits B and C are identical and a "high" logic level when bits B and C are different. Signal F, which is obtained after inversion by an inverter 100, is applied to the resetting-to-zero or "RAZ" input of a trigger circuit, 11, whose inverting output $\bar{Q}$ is connected to input "E", the signal ST being applied to the clock or "HOR" input. Thus, when F is at the "high" level, i.e when B anc C are identical, the trigger-circuit output "Q" changes state in synchronism with ST. On the other hand when F is at the "low" level, the signal G at the output "Q" is held at the "low" level. The monostable multivibrator 12, actuated by the rising fronts of signal G, delivers calibrated jump control pulses at K only when the levels of B and C are identical. The pulses are enabled only when the frame number present at A coincides with the frame number at which it is desired to make a stop and which is written as $A_o$. Enabling can be brought about by a manual switch or by an automatic frame search device 15 whose output V changes state when A and $A_o$ coincide, the device being associated wih an electronic switch 16, e.g comprising an AND gate followed by a signal-shaping circuit. Pulses K, therefore, after being enabled, are transmitted to the driving device 14 for moving forward the reading head. Any pulse at L causes the reading head to jump in the desired manner. In the case of a stop at an frame, the reading head jumps back one turn.

Figure 6:
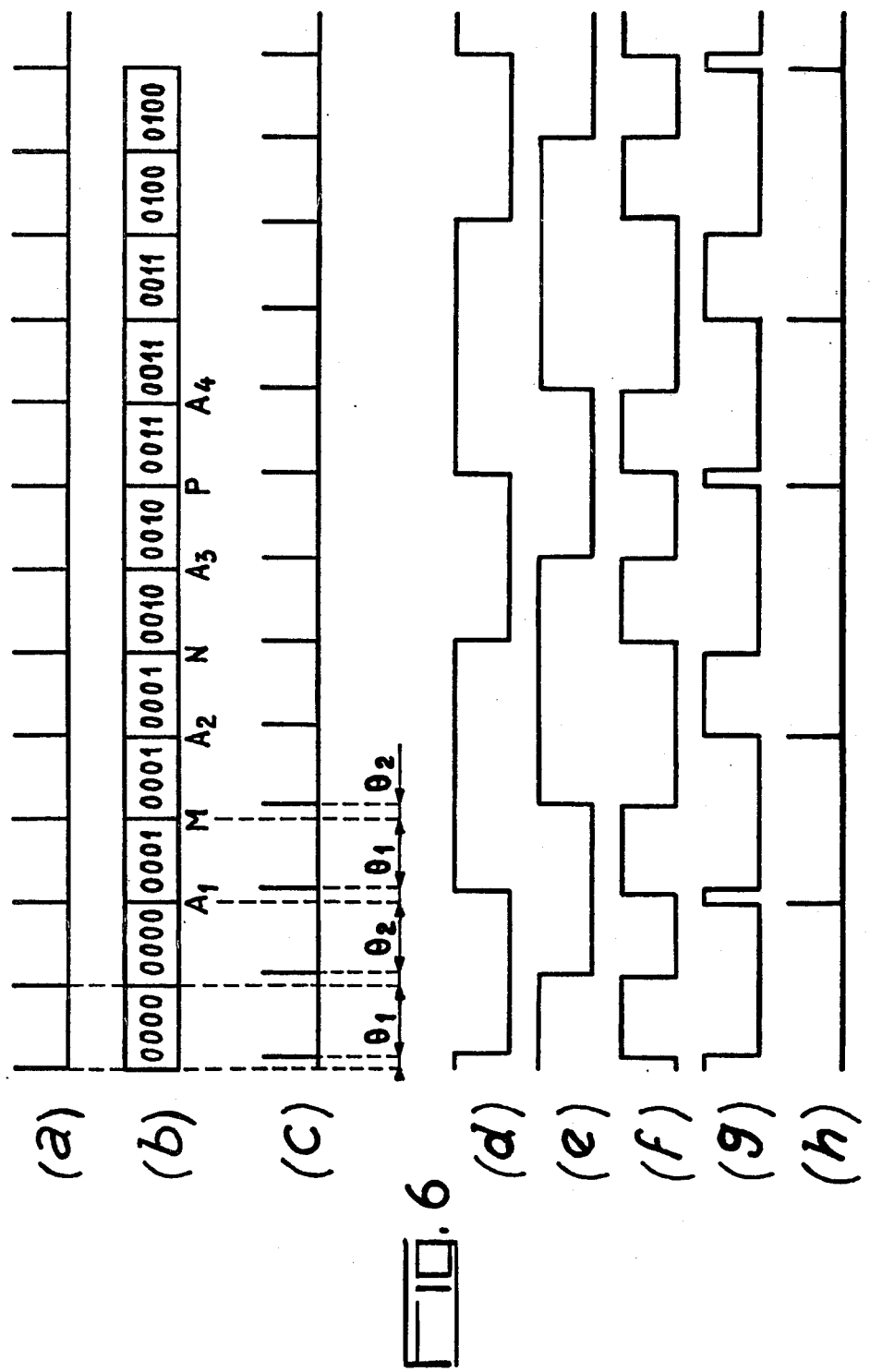
FIGS. 6, a-h, 7, a-h, 8, a-e and 9, a-d, are diagrams illustrating the operation of the invention.

FIG. 6 shows the appearance of the signals present at various points in the circuit when the track is scanned without acting on the switch in order to bring about a stop at an frame (V=0), in the case of a standard at 60 fields per second. The field synchronization signal ST is shown at (a), the numbers written in the portions of the read tracks determined by points $A_1$, $A_2$, $A_3$, $A_4$, M, N, P are shown at (b); the signal H, which is delayed with respect to signal ST by an amount $\theta_1$ equal to 16 times the duration of a line, or an amount $\theta_2$ equal to 16.5 times the duration of a line, is shown at (c); the signal at B is shown at (d), the signal at F is shown at (e); the signal at D is shown at (f); the signal at G is shown at (g); and the signal at K is shown at (h).

Figure 7:
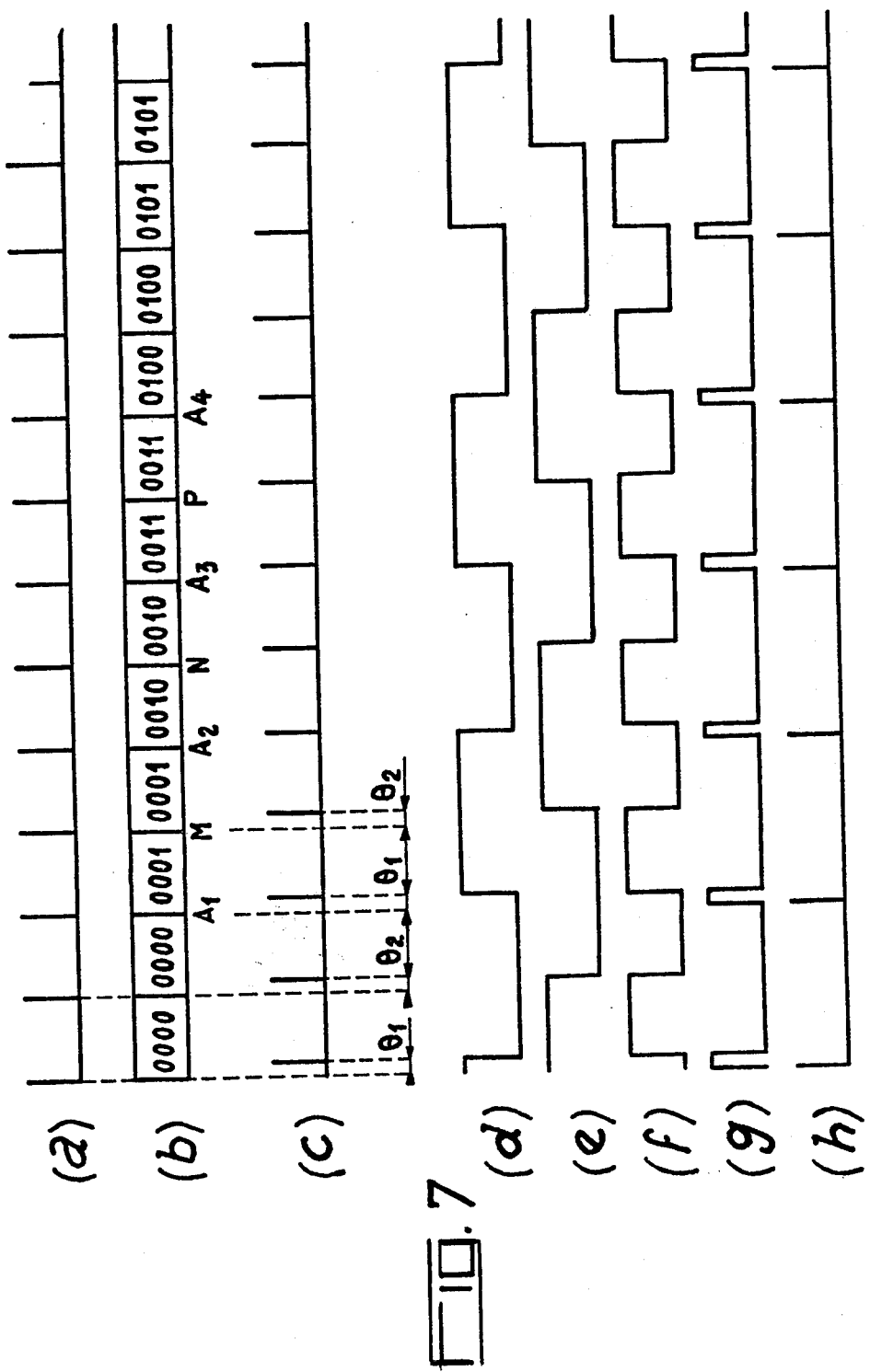

FIG. 7 shows the appearance of the same signals in the case of a standard of 50 fields per second. The signals from (a) to (h) are the same as from (a) to (h) in FIG. 6.

Figure 8:
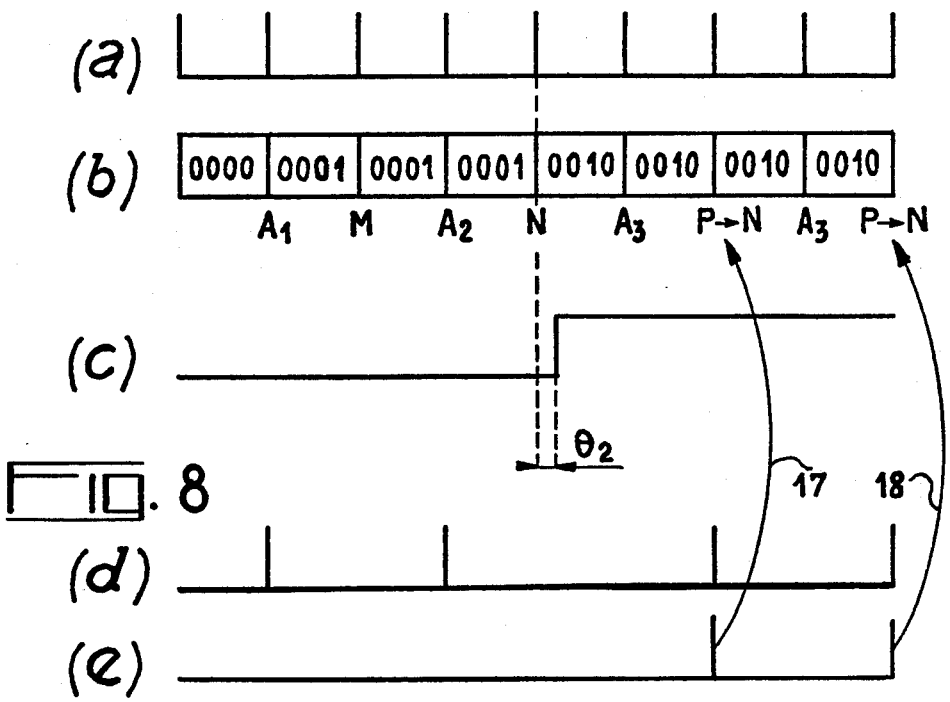
Figure 9:
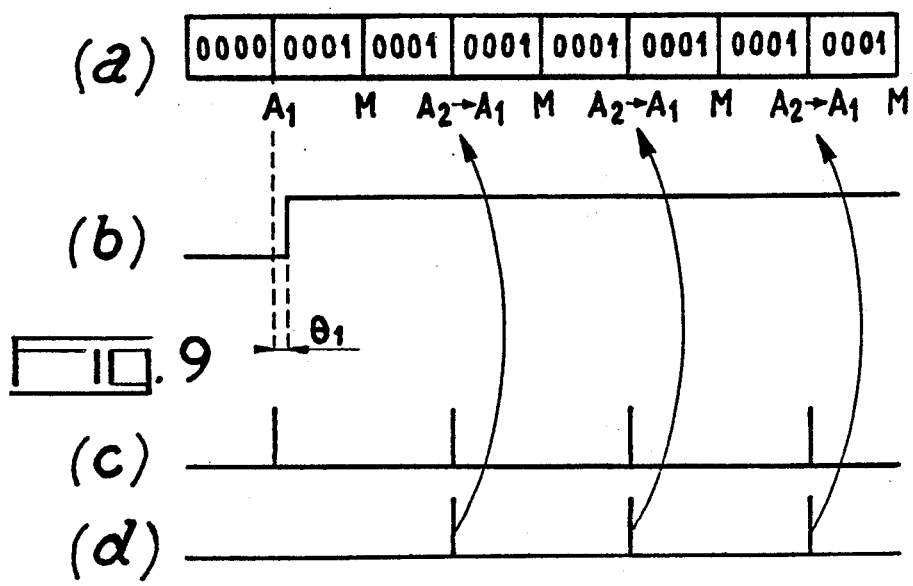

FIGS. 8 and 9 can be used to test the operation of the device in the case of a standard of 60 fields per second. In FIG. 8, it is assumed that it is desired to stop at the frame coded 0010, the number which has been written at $A_o$. The switch operates (e.g when the signal V changes from 0 to 1) when the value 0010 is decoded, i.e at a shift of $\theta_2$ relative to the beginning of the first field of frame 0010. Signal ST is shown at (a); the portions of track scanned by the reproduction head at (b); the signal V at (c); the signal K at (d), and the signal L at (e). Arrows 17 and 18 indicate that pulses L cause the reading head to jump backwards. This jump occurs at each turn. As long as V remains at level 1, the track portion N $A_3$ P will be read, i.e the two fields forming frame 0010, with a periodic jump from P to N.

In the case of FIG. 9, it is assumed that it is desired to stop at the frame coded 0001, which has been analyzed in three fields, i.e by scanning the first field of the frame followed by the second field and then again by the first.

The signals from (a) to (d) are the same respectively as in FIG. 6, from (b) to (e). In FIG. 9, the indefinitely repeated turn is $A_1$ M $A_2$ with a jump from $A_1$ to $A_2$, corresponding to the two fields making up the frame 0001. The third field is never read, but this does not matter since it is a repetition of the first.

The operation of the device can be similarly checked in the case of the standard of 50 fields per second, corresponding to FIG. 7.

It is not necessary to record the frame numbers during recording of the information. It is sufficient to record one bit which changes state at each new frame, in which case the frame can be found by using the manual switch.

Another advantage of the device is of obviating faults occurring in the optical reader e.g an abrupt, unplanned jump of the reading spot. The device is constantly on the alert, and a loss of synchronization can be rapidly made up since the comparator, when changing state, can correctly re-adjust the device to a different frame if necessary.

The invention is of use inter alia for reading television signals recorded on a video disc, the signals being obtained from a telecinema-type frame analyzer. The invention has been described mainly with a view to obtaining a stop at a frame. It can also be used for obtaining other effects such as slowing-down and acceleration.

What I claim is:

1. An optical reading device for reading an information carrier on which is recorded a sequence of animated frames along a track made of turns, each of said turns comprising two fields of video signal, a frame identification signal being recorded at the top of each of said fields, said frame identification signal comprising at least one test bit changing value at each successive frame, said optical device comprising an optical reader head, a driving device for moving said reader head, a control device for generating track jump pulses for controlling said driving device, said control device comprising means for detecting said frame identification signals, storing means for storing said identification signal during one field and comparing means for comparing two successive of said identification signals read in two adjacent fields and for delivering at least one of said track jump pulses when said two adjacent fields belong to the same frame.

2. An optical reading device as claimed in claim 1, wherein each frame is made up of two fields.

3. An optical reading device as claimed in claim 1, wherein the number of fields belonging to a single frame is alternatively 2 for a given frame and 3 for the next frame, the third field being a repetition of the first.

4. An optical reading device as claimed in claim 1, wherein said identification image signal is the coded representation of a number allocated to the corresponding frame, the value of the number being increased by unity from one frame to the next, the test bit being the lowest-weight bit.

5. An optical reading device as claimed in claim 1, wherein said identification frame signal comprises a single bit which changes from a frame to the next frame.

6. An optical device as claimed in claim 1, wherein said detecting device further delivers a synchronization signal for controlling said storing means.

7. An optical reading device as claimed in claim 6, wherein said comparing means comprises a monostable circuit and a trigger circuit for controlling said monostable circuit, the output signal of said trigger circuit being blocked when the two compared identification signals are not identical, and changing state at the end of the second field belonging to the same frame when said compared identification signals are identical.

8. An optical reading device as claimed in claim 1, comprising an enabling device delivering orders, said track jump pulses controlling said driving device for moving said reader head in accordance with said orders.

9. An optical reading device as claimed in claim 8, wherein said driving device moves said reader head in order to bring about a stop at a desired frame.

10. A system for playing back a TV signal from a disc-shaped record carrier, said TV signal having been recorded as a sequence of sets of fields, with two fields of said sets of fields having been recorded per track circumference, consecutive scenes of the TV signal corresponding to consecutive sets of at least two fields, in accordance with a specific pattern, and successive indication signals recorded in each field changing value at each successive image, said system comprising means for generating track jump pulses, detecting means for sensing said indication signals, and selecting means connecting said detecting means to said generating means for controlling said generating means to scan under the control of said indication signals only those sets of two consecutive fields that correspond to a single scene of the TV signal.

* * * * *